(12) United States Patent
Reouveni et al.

(10) Patent No.: US 12,579,986 B2
(45) Date of Patent: Mar. 17, 2026

(54) SYSTEMS AND METHODS FOR DISTINGUISHING BETWEEN HUMAN SPEECH AND MACHINE GENERATED SPEECH

(71) Applicant: Outbound AI Inc., Seattle, WA (US)

(72) Inventors: Ronen Reouveni, San Diego, CA (US); Robert Piro, Ellensburg, WA (US); Jonathan Wiggs, Seattle, WA (US); Christina Quinn, Portland, OR (US); Mohammed Soliman, Newton, MA (US)

(73) Assignee: Outbound AI Inc., Seattle, WA (US)

( * ) Notice: Subject to any disclaimer, the term of this patent is extended or adjusted under 35 U.S.C. 154(b) by 190 days.

(21) Appl. No.: 18/602,835

(22) Filed: Mar. 12, 2024

(65) Prior Publication Data

US 2024/0312466 A1 Sep. 19, 2024

Related U.S. Application Data

(60) Provisional application No. 63/451,985, filed on Mar. 14, 2023.

(51) Int. Cl.
| | |
|---|---|
| *G10L 17/14* | (2013.01) |
| *G06F 40/30* | (2020.01) |
| *G10L 15/26* | (2006.01) |
| *G10L 17/00* | (2013.01) |
| *G10L 17/02* | (2013.01) |
| *G10L 17/22* | (2013.01) |
| *G10L 17/26* | (2013.01) |
| *H04M 3/51* | (2006.01) |

(52) U.S. Cl.
CPC .............. *G10L 17/14* (2013.01); *G06F 40/30* (2020.01); *G10L 15/26* (2013.01); *G10L 17/00* (2013.01); *G10L 17/02* (2013.01); *G10L 17/22* (2013.01); *H04M 3/5166* (2013.01)

(58) Field of Classification Search
CPC ......... G10L 17/14; G10L 15/26; G10L 17/00; G10L 17/02; G10L 17/22; G10L 17/26; G06F 40/30; H04M 3/5166
USPC ...................................................... 704/235
See application file for complete search history.

(56) References Cited

U.S. PATENT DOCUMENTS

| | | | | |
|---|---|---|---|---|
| 11,074,407 B2 * | 7/2021 | Kannan | ................. | G06F 16/353 |
| 11,128,636 B1 * | 9/2021 | Jorasch | ................. | H04W 12/08 |
| 11,158,327 B2 * | 10/2021 | Choi | ........................ | G10L 17/04 |
| 11,410,657 B2 * | 8/2022 | Kim | ......................... | G06N 3/09 |
| 11,449,668 B2 * | 9/2022 | Mann | .................... | H04L 63/102 |

(Continued)

FOREIGN PATENT DOCUMENTS

| | | | | |
|---|---|---|---|---|
| AU | 2023221266 A1 * | 9/2024 | ........ | G06F 3/04815 |
| CN | 107122154 A * | 9/2017 | ........... | G06F 40/216 |

(Continued)

*Primary Examiner* — Edwin S Leland, III

(74) *Attorney, Agent, or Firm* — FisherBroyles LLP; Alan D. Minsk

(57) ABSTRACT

Systems, devices, and methods for determining whether a segment of speech was generated by a human or by a machine, such as a robotic voice that is synthesized and used as part of an IVR system. The disclosed approach can be used to assist in implementing a process to automate the detection of the start and end of a hold time during a call to a call center and in response execute a desired action.

20 Claims, 6 Drawing Sheets

(56) References Cited

U.S. PATENT DOCUMENTS

| | | | | |
|---|---|---|---|---|
| 11,672,479 | B2 * | 6/2023 | Jorasch | A61B 5/7203 |
| | | | | 726/7 |
| 12,061,861 | B2 * | 8/2024 | Liu | G06F 40/166 |
| 12,348,674 | B2 * | 7/2025 | Reouveni | H04M 3/493 |
| 2020/0023856 | A1 * | 1/2020 | Kim | B60R 16/0373 |
| 2020/0035244 | A1 * | 1/2020 | Kim | G06N 3/008 |
| 2020/0035249 | A1 * | 1/2020 | Choi | G10L 17/18 |
| 2020/0302015 | A1 * | 9/2020 | Kannan | G06F 40/284 |
| 2021/0272040 | A1 * | 9/2021 | Johnson | G10L 25/24 |
| 2022/0006813 | A1 * | 1/2022 | Jorasch | G16H 50/30 |
| 2023/0315247 | A1 * | 10/2023 | Pastrana | G06F 1/1626 |
| | | | | 715/716 |
| 2023/0351098 | A1 * | 11/2023 | Liu | G06F 40/151 |
| 2024/0312466 | A1 * | 9/2024 | Reouveni | G10L 17/14 |

FOREIGN PATENT DOCUMENTS

| | | | | | |
|---|---|---|---|---|---|
| CN | 112262431 | A | * | 1/2021 | G10L 15/30 |
| JP | 2018132754 | A | * | 8/2018 | G06F 16/3329 |
| JP | 6448723 | B2 | * | 1/2019 | G10L 15/22 |
| JP | 2025507385 | A | * | 3/2025 | G06F 3/04815 |
| KR | 20240132373 | A | * | 9/2024 | G06F 3/04815 |
| WO | WO-2023158745 | A1 | * | 8/2023 | G06F 3/04815 |

* cited by examiner

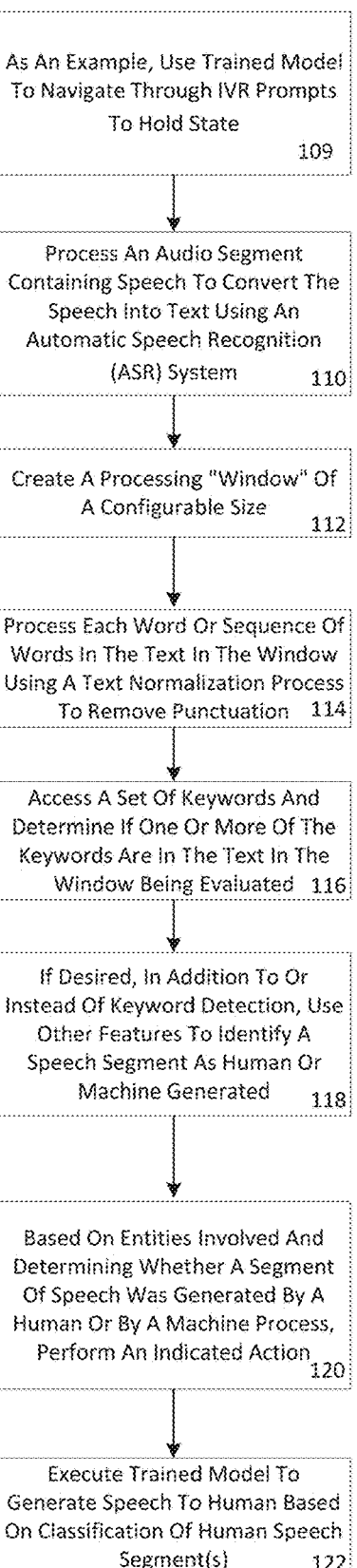

As An Example, Use Trained Model To Navigate Through IVR Prompts To Hold State 109

Process An Audio Segment Containing Speech To Convert The Speech Into Text Using An Automatic Speech Recognition (ASR) System 110

Create A Processing "Window" Of A Configurable Size 112

Process Each Word Or Sequence Of Words In The Text In The Window Using A Text Normalization Process To Remove Punctuation 114

Access A Set Of Keywords And Determine If One Or More Of The Keywords Are In The Text In The Window Being Evaluated 116

If Desired, In Addition To Or Instead Of Keyword Detection, Use Other Features To Identify A Speech Segment As Human Or Machine Generated 118

Based On Entities Involved And Determining Whether A Segment Of Speech Was Generated By A Human Or By A Machine Process, Perform An Indicated Action 120

Execute Trained Model To Generate Speech To Human Based On Classification Of Human Speech Segment(s) 122

SYSTEMS AND METHODS FOR DISTINGUISHING BETWEEN HUMAN SPEECH AND MACHINE GENERATED SPEECH

CROSS REFERENCE TO RELATED APPLICATION

This application claims the benefit of U.S. Provisional Application No. 63/451,985, filed Mar. 14, 2023, entitled "Systems and Methods for Distinguishing Between Human Speech and Machine Generated Speech", the disclosure of which is incorporated, in its entirety (including the Appendix) by this reference.

BACKGROUND

With the proliferation of techniques for generating human-like speech and the use of interactive voice response (IVR) systems as an interface between a person and a set of resources, it can sometimes be difficult to determine the source of an example of speech, for example, whether an example was generated by a human or by a speech synthesis technology. This can be an important distinction in situations where navigation through an IVR menu or providing the proper response to a caller's inquiry may depend on distinguishing whether a person has responded to an IVR prompt, or instead the IVR system has generated a new prompt using a speech synthesis technique.

A possible approach to addressing this problem is to attempt to identify patterns of speech that are more likely to be human generated as opposed to machine generated or otherwise synthesized. This may be based on identifying a pattern that is most like human generated speech, such as words or phrases associated with a human speaker, or with a specific human speaker, and unlikely to be generated by a machine or other form of automated process.

However, conventional approaches to doing this typically require extensive training data or examples to make an accurate determination. Furthermore, conventional approaches are not well-suited to environments or uses in which it is desirable to make the determination between machine generated and human generated speech in real-time or almost real-time. This is at least in part because such approaches require not only sufficient training data but also a greater number of words to be spoken before a determination can be made than is desirable (or in some cases, feasible) for a real-time determination. This is a result of conventional approaches seeking to identify a specific speaker rather than to determine if a segment of speech is human or machine generated.

Speaker diarisation (or diariazation) is another process sometimes used to partition an audio stream containing human speech into segments according to the identity of each speaker. It can enhance the readability of an automatic speech transcription by structuring the audio stream into speaker turns and, when used together with speaker recognition systems, by providing a speaker's identity. However, it has problems differentiating between similarly pitched voices and is primarily used to identify a specific speaker rather than to determine if a segment of speech is human or machine generated. As with other conventional approaches, it may require more time to make a determination than is desirable for a real-time or almost real-time application. Conventional approaches may also encounter difficulties in handling variations or errors that occur in transcribing an audio segment of speech into text for evaluation.

Conventional approaches and methods require a relatively large set of inputs to use the methods or for training and using a machine learning model or expert system, which makes them largely unsuitable for real-time classification, use case adaptation, or scalability across domains. For example, the conventional methods are usually applied to an entire section of text, and not used for a real-time speech classification process. This limits the feasibility of using the conventional approaches in many real-life situations in which determining whether speech was generated by a human or by a machine would have value, such as automating hold times or screening out machine generated spam calls, as examples.

Embodiments of the disclosure overcome these and other disadvantages of conventional approaches, both collectively and individually.

SUMMARY

The terms "invention," "the invention," "this invention," "the present invention," "the present disclosure," or "the disclosure" as used herein refer broadly to all subject matter disclosed and/or described in this specification, the drawings or figures, and to the claims. Statements containing these terms do not limit the subject matter disclosed and/or described, or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor to be used in isolation to determine the scope of the claimed subject matter. The subject matter should be understood by reference to appropriate portions of the entire specification, to any or all figures or drawings, and to each claim.

This disclosure is directed to systems, devices, and methods for determining whether a segment of speech was generated by a human or by a machine, such as a robotic voice that is synthesized and used as part of an IVR system. A goal of the disclosed system and methods is to classify a language pattern as either human generated or machine generated, and with near real-time classification of the detection of the language pattern event.

In one embodiment, a use case for the disclosure is directed to distinguishing human speech versus recorded and/or machine generated speech when a "conversation" or session includes prompts or statements generated by a machine and provided through an IVR system. One benefit of accurately performing this function in real-time is automating the generation of notifications or alerts to one or both of a call center representative and an inbound caller regarding when a call is placed on hold or removed from that state.

Another non-limiting example of a use case is to assist in screening inbound calls to determine if the entity calling is a human or is machine generated speech and more likely to be undesirable to answer (such as being spam). In such cases, the entity placing the call could be a human or machine (such as a trained model or IVR system associated with a call center), and the entity receiving the call could be a human or machine (such as an IVR system associated with a different call center).

In either situation, an embodiment of the disclosed and/or described approach could be implemented to assist either the entity placing a call or the entity receiving a call. As one example, this could have value because if the caller is a human, the recipient of the call might be more likely to answer. This could also apply to analyzing a message left in a person's voicemail to assist the person in deciding whether to respond to the message. An embodiment could also be used to allow a call center to determine if an incoming call was placed by a human or an IVR system and choose whether to respond to the call.

In one embodiment, the disclosed method may comprise one or more of the following steps, stages, processes, operations, or functions:

Process an audio segment containing speech to convert the speech into text using an automatic speech recognition (ASR) system;

Create a processing "window" of a configurable size;

When a new word is generated (output) by the ASR processing, it is added to the window. When this window reaches a configurable maximum size, the next word is added and the oldest word presently in the window is removed (as in the operation of certain examples of a buffer). This creates the equivalent of a moving window being slid over the text, where the window itself has a configurable size;

Consider the input as a set of key-value pairs. Each key is the token being added to the window and the value contains information regarding a word, phrase, or other section of text obtained by converting an audio segment;

For example, the value could contain a list that includes the word, the volume of the word when spoken, an indication of emphasizing a word, the elapsed time length of the word, and the time between that word and the previous word. In this way the disclosed and/or described system has relevant information at its disposal to assist in its evaluation of the speech segment;

Optionally, calculate summary statistics for the window, the minimum phrase size in terms of length of the word, the maximum phrase size, the average phrase size, or the standard deviation or variance in breaks between words, as non-limiting examples. This would enable comparing the summary statistics across different windows;

Process each word or sequence of words in the text in the window using a normalization process to remove punctuation. By doing this, the system ensures that the elements in the window are "true" elements and not examples of punctuation;

Other normalization or standardization processes or techniques may be applied if relevant to a use case or aspects of a speech pattern;

Access a set of one or more keywords and determine if one or more of the keywords are in the text (in the window) being evaluated;

In one embodiment, the keywords each relate to or are indicative of a specific language pattern that has been defined or described. In one embodiment, the system determines if one or more of the specified keywords are in the window. If one or enough of the keywords are in the sliding window, the system terminates the processing and generates a notification that the "event", or language pattern has been detected;

In one embodiment, a set of criteria or rule, that if triggered would indicate that the speech was determined to be live human generated speech and not that of a pre-recorded human or machine may be applied;

If desired, in addition to (or instead of) keyword detection, one or more of the following analysis techniques may be used:

An embodiment can analyze features such as speed of speech. This may be useful as machine generated speech and human speech have distinctly different speeds. Therefore, it can increase accuracy and reliability of a system to include this in a decision process. In one embodiment, the speed of speech data may be combined with detection of one or more keywords;

An embodiment can obtain predictive information by considering periods of silence. A system may use the amount of detected silence to allow determination of machine generated (robotic) as opposed to human speech. This will allow the system to consider another item of predictive information when classifying whether a speech segment was most likely human, or instead machine generated. This feature can be combined with one or more of the features discussed herein;

Thus, an embodiment may operate to extract information in addition to the presence or absence of specific words and use that information to make a more accurate determination or classification as to the source of the speech being processed;

An embodiment may store summary statistics for an entire window and compare that overtime (this is in effect comparing window to window). This could be used as part of edge case detection for a situation that is missed within a window;

Based on determining whether a segment of speech was generated by a human or by a machine process (e.g., a recording or voice synthesis), perform one or more events or actions, where those events, or actions may include one or more of:

Generate a notification or form of alert to a waiting caller (such as a customer or user) that a human call center agent is available to speak with them;

Initiate a call-back to a human who contacted a call center or other IVR system;

As disclosed and/or described, use cases for an embodiment may include one or more of:

Screening of incoming calls to a user, followed by sending a notification to a mobile cellphone or landline user if an incoming call is from a machine/robot or from a human;

Screening of voicemails to determine if the entity that called and left a message was a human or machine/robot;

In this regard, a valuable use case may be a call center that is trying to detect if an incoming call is from a machine (such as another call center) or a human, and use that to deny service to machine generated calls;

Determine or enhance an understanding of the distribution of the duration of a set of calls or of a set of sections of a call;

This may be of use in determining the expected hold times during a call;

Similarly, this information may be used to evaluate the efficiency and call processing flow of a call center based on response times, resolution times, or another metric;

Collecting and evaluating call center statistics for calls handled, calls resolved, time to resolution, or percentages of incoming calls that are placed by humans.

In one embodiment, the disclosure is directed to a system for determining whether a segment of speech was generated by a human or by a machine, such as a robotic voice that is synthesized and used as part of an IVR system. The system may include a set of computer-executable instructions stored in (or on) a memory or data storage element (such as one or more non-transitory computer-readable media) and one or more electronic processors or co-processors. When executed by the processors or co-processors, the instructions cause the processors or co-processors (or a device or apparatus of which they are part) to perform a set of operations that implement an embodiment of the disclosed and/or described method or methods.

In one embodiment, the disclosure is directed to one or more non-transitory computer-readable media containing a set of computer-executable instructions, wherein when the set of instructions are executed by one or more electronic processors or co-processors, the processors or co-processors (or a device or apparatus of which they are part) perform a set of operations that implement an embodiment of the disclosed and/or described method or methods.

In some embodiments, the systems and methods disclosed herein may provide services through a SaaS or multi-tenant platform. The platform provides access to multiple entities, each with a separate account and associated data storage. Each account may correspond to a user, set of users, an entity (such as a human, trained model, or IVR system), a set or category of entities, an industry, an IVR system, a call center wanting to monitor incoming calls and filter out machine generated calls, a communication session, or an organization, for example. Each account may access one or more services, a set of which are instantiated in their account, and which implement one or more of the methods or functions disclosed and/or described herein.

Other objects and advantages of the systems, apparatuses, and methods disclosed and/or described herein may be apparent to one of ordinary skill in the art upon review of the detailed description and the included figures. Throughout the drawings, identical reference characters and descriptions indicate similar, but not necessarily identical, elements. While the embodiments disclosed and/or described herein are susceptible to various modifications and alternative forms, specific embodiments are shown by way of example in the drawings and are described in detail herein. However, embodiments of the disclosure are not limited to the exemplary or specific forms described. Rather, the present disclosure covers all modifications, equivalents, and alternatives falling within the scope of the appended claims.

BRIEF DESCRIPTION OF THE DRAWINGS

Embodiments of the system and methods in accordance with the present disclosure will be described with reference to the drawings, in which:

FIG. 1(*b*) is a flow chart or flow diagram illustrating a method, process, operation, or set of functions that may be used to implement speech segment processing as part of an embodiment of the disclosed and/or described system and methods;

Note that the same numbers are used throughout the disclosure and figures to reference like components and features.

DETAILED DESCRIPTION

Figure 1A:
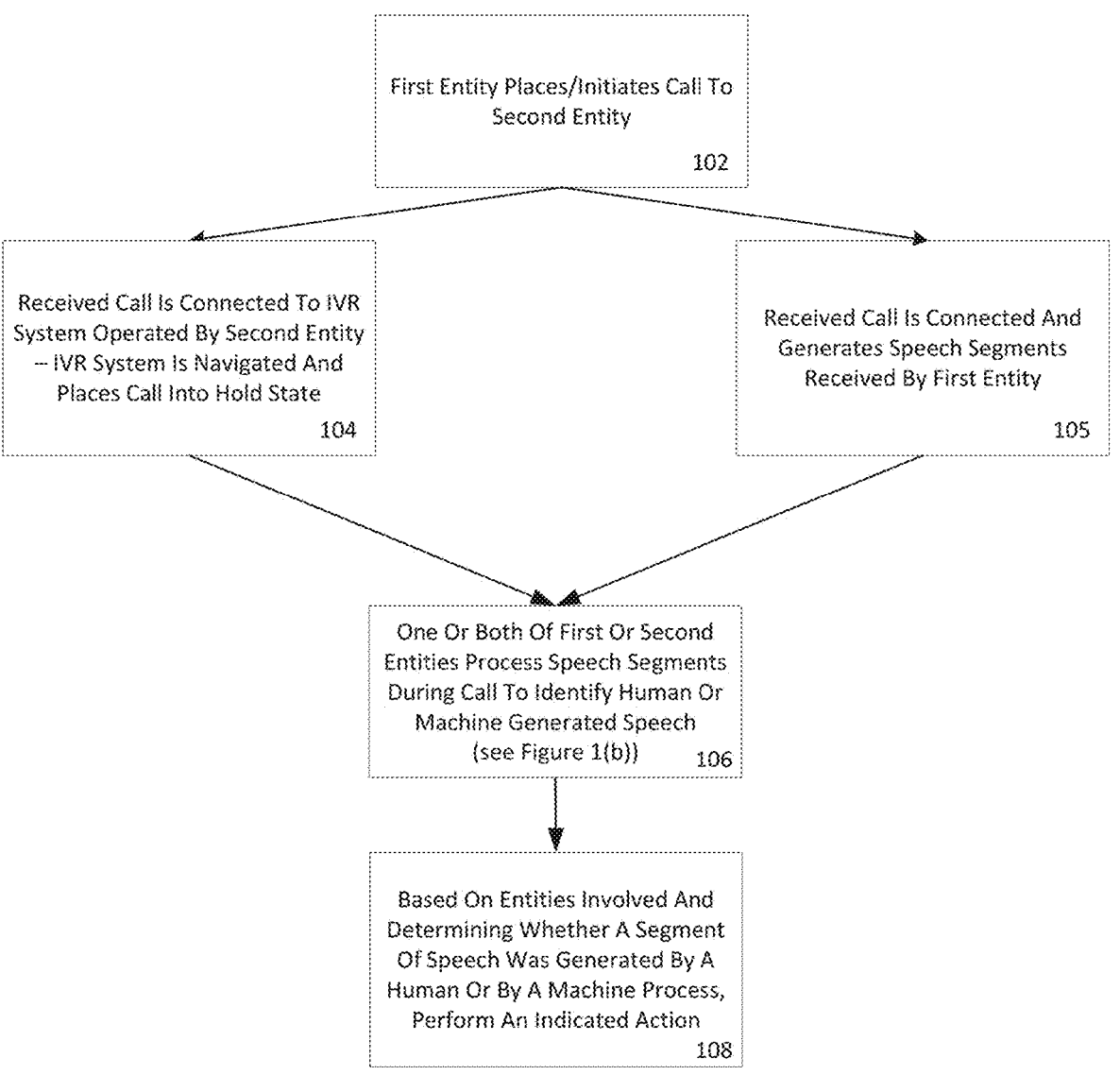
FIG. 1(*a*) is a flow chart or flow diagram illustrating a method, process, operation, or set of functions that may be used to implement an embodiment of the disclosed and/or described system and methods.

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure are described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among others, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, co-processor, microprocessor, CPU, GPU, TPU, QPU, or controller, as non-limiting examples) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, the systems and methods disclosed herein may be provided (in whole or in part) through a SaaS or multi-tenant platform. The platform provides access to multiple entities, each with a separate account and associated data storage. Each account may correspond to a user, set of users, an entity (such as a human, trained model, or IVR system), a set or category of entities, an industry, an IVR system, a call center wanting to monitor incoming calls and filter out machine generated calls, a communication session, or an organization, for example. Each account may access one or more services, a set of which are instantiated in their account, and which implement one or more of the methods or functions disclosed and/or described herein.

In some embodiments, one or more of the operations, functions, processes, or methods disclosed herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

In the context of the disclosed and/or described systems, apparatuses, and methods, the following terms are understood to have at least the indicated meanings:

IVR: Interactive voice response is a technology that allows humans to interact with a computer-operated phone system using voice and/or DTMF tones input via a keypad;

On Hold: Given a call has been initiated, one channel is placed in a state of waiting to interact with another channel. For example, a human is waiting to speak with another human or waiting to interact with some sort of machine generated voice or message;

Call: Telecommunication between two or more parties;

Event: A location in a transcription of a call related to a specific action. For example, being placed on hold, or a human answering the phone and ending an on-hold period;

Keywords: A collection of words that if found in a configurable window indicate/define the presence or absence of an event;

In the context of this disclosure, a "keyword" may be described as a word or sequence of words characteristic of a human speaker, or generally found in human speech. This may include pauses, changes in speaking speed, distortions, or other sounds characteristic of human speakers, but not expected in speech segments generated by a machine;

Window: A fixed number of words to be considered at a single point for further processing;

Sliding Window: In the context of the disclosure, moving a window over a text, and removing the oldest word in the window to make room for the newest word;

Writing Signature: A unique indicator as to which individual is communicating (e.g., human, machine, or a specific human, as examples);

Silence between words: The time between when the speaking of one word is completed and speaking the next word begins;

Silence variation (a measure of dispersion, includes standard deviation and variance): The statistical variation of time between a set of words;

Silence variation (measures of central tendency, includes mean, median mode): The statistical measure(s) of central tendency of the time between words;

Variation in word length—a measure or indication of the length (in letters or spoken time);

Entity—a human, trained model, call center, automated process, or IVR system that either places/initiates a call or is the recipient of a call placed by another entity.

As suggested, there are multiple reasons why being able to distinguish between human and machine generated speech can be helpful or desired. One example, and generally the most useful, is the ability to alert a user when a human (such as a customer service representative) has been reached and communication is no longer being driven by an automated system (such as an IVR).

As one example, a benefit of the ability to classify or identify speech as human or instead as robotic or machine generated speech is the capability of automating hold times. If one can accurately determine whether a speech segment was generated by a human or by a machine, a system could send a notification to a user (such as an inbound caller) when a human call center representative began speaking. This would mean the inbound caller (who may be a customer or client of an organization using the IVR system) would not have to actively wait on hold for a human to speak with them.

In general, the detection of unique language patterns within a speech segment that has been converted to a stream of text can be a difficult problem given the variety of ways in which people speak, their mannerisms, and even the use of idioms or other local forms of speech. For example, some people prefer to use specific adjectives. However, this usage may not be consistent enough to classify two different speakers (i.e., a human, machine, a recording of a human, or two humans) based on a limited sample of text. Further, as mentioned, inconsistency or errors in transcription (the conversion of an audio segment to text) may complicate a process of determining the source of an example of speech.

Conventional approaches may, in some situations, be capable of speaker classification based on a "writing signature", where a writing signature may be characterized by "markers", such as words or phrases commonly used, or even the amount a speaker uses a filler term such as "the". However, this is still of limited value and prone to error, as well as often not being capable of being performed accurately in real-time.

Additionally, application of downstream machine learning based tasks would likely be separated by speaker classification, i.e., human as opposed to machine. To accurately segment training data for a model (such as a machine learning model), one would need to accurately segment the speakers (based on audio segments) into human or machine classes. For example, a system or process flow may only be interested in the sentiment as part of natural language understanding (i.e., the emotional level of the speaker) if a speaker is a human.

Another use case could be applying a custom transcription model based on the type of entity speaking, such as by use of a specific model to transcribe and analyze the text derived from a speech segment based on whether the speaker is machine or human. This enables the use of a different evaluation or analysis pipeline depending on whether the speaker is believed to be human or a machine.

Similarly, a different natural language understanding model could be applied depending on whether a segment of speech was determined to be human, or machine generated. This would enable more accurate processing of text to assist in understanding intent (or another aspect of a speech segment or reason for a call) and generating an effective response.

As another example, if a system or process is determining or tracking how deep (i.e., to what level or degree of precision) a subject or category was reached in a conversation, it may be helpful to know if the speech segment that caused a "conversation" to end was initiated by a human or by a machine when evaluating the effectiveness of the conversation.

Conventional speech-to-text engines can sometimes provide a degree of speaker segmentation by distinguishing between male vs. female sounding voices. However, this capability is not sufficient to distinguish a human speaker as opposed to speech generated by a machine (except in a very limited case, such as a female human vs. a male voice generated by a machine). This is believed to be because frequency or pitch-based speaker segmentation is not sensitive enough to accurately distinguish between human and machine speech, especially with recent advancements in techniques for voice synthesis. While conventional speaker segmentation methods may indicate that a speaker has changed, it may be unable to accurately determine if a speaker is a human or is instead machine generated speech.

Among other advantages, one benefit of the disclosed and/described approach is that it can be used to assist in implementing a process to automate the detection of the start and end of a hold time during a call. This is valuable both to call centers and end-users, as if it is possible to accurately detect human speech vs. machine generated (IVR/robotic speech), then a system could send a notification to a caller as soon as a human call center representative was speaking. This would mean both that a customer service representative would not have to actively wait on hold during an IVR session with an end-user, and the end-user would not have to wait on hold without being able to perform another activity.

In addition, a call center could use this information to capture information regarding the disposition of incoming calls, call center productivity, or other metrics of interest. A further use case is to allow a call center to decide if an incoming call was placed by a human or by a machine in order to filter out machine generated calls.

There are benefits to understanding the relationships or distribution of timestamps (to determine the length) for the events in a call. This is important, as understanding call time event distribution is made possible by being able to accurately find the locations of events or actions in a call. Finding the locations of events during a call enables the calculation of distributions for specific call sections instead of for a call in its entirety. As an example, if a process can be used to automate the hold time (detection of its start or its end, for example) of a call, the process can more accurately assess how much time that capability would save for an inbound caller, and in some cases, for the recipient of a call.

If a call center or other system makes outbound calls to other call centers, as is the case with insurance in the US, then they would want to avoid hold times, where avoiding hold times may be complicated by the difficulty in distinguishing between human and machine generated speech. Note that call centers may be inbound, outbound, or both inbound and outbound. For example, there are call centers that make outbound calls to other call centers that are inbound only (e.g., a doctor's office that offloads billing questions to a call center that reaches out to insurance companies (which are typically routing calls to another call center)). In some cases, a call center or system may use an IVR system or trained model to place a call to a recipient entity (such as a human, call center, or IVR system).

Further, if a call consists of a hold time and a human speech time, the disclosed and/or described processes could be used to compare only hold times or only human conversation times between a call source and the recipient of a call (such as two organizations). As mentioned, another aspect could be the evaluation of the efficiency of the operation of a call center. If there are workers in a call center making calls and they are placed on hold, a process can analyze the times during which there is a human-to-human conversation. Without understanding the timestamps of events based on an ability to detect human as opposed to machine-generated speech, these analytics would not be possible, or at least not as reliable.

An important aspect of the disclosed and/or described system and methods is that it assists in accurately calculating such distributions. By generating accurate distributions for each section or event of a call, one could build models to enable the prediction of events during a call (as this would benefit from accurate modeling of the underlying statistical distributions). For example, knowledge of the underlying distribution(s) would enable more accurate modeling of hold times as a function of time of day or call center load, specific call events that might require follow up, or other aspects of an interaction between a call center and a caller.

As one example, such a distribution may be determined using the following process flow:

Collect multiple calls, call that 'X' calls (the more the better, and likely one hundred or more may be needed); These calls would be collected per department or function;

Record the time of day of each call and the average length of the hold time after navigation through an IVR or other system;

One would want to decide upon a granularity of time placed. Assume granularity of 30 minutes for example. In that case, all calls placed within a 30-minute window would be considered to have occurred at the same time;

Calculate the average hold time given the time of day of receiving a call;

Evaluate, model, or analyze how this value evolves over a day (if it all).

With this approach and information, a person could determine that calling department z has an average hold time w at time-of-day t, and an average hold time q at time t+1. If w>q, then the user would prefer to make the call at time t+1 and therefore be more likely incur a lesser hold time.

There are other benefits from being able to understand a set of events during a call. If one considers a situation in which hold times (i.e., the detection of the beginning and end of a hold period) are able to be determined (or at least estimated) automatically, a user (either a call center representative or a person or system who placed a call) may want to initiate another call while they are on the phone with a first call. For example, if one knew that the average hold time is x, and the average human conversation time is y, then one could determine a suitable point during a human conversation to initiate another call or take some other action.

Similarly, if the call center IVR system is waiting on hold for a caller, then it would want to ensure the current call is over before the next call is answered. Using historical distributions, these types of call management and control could be more readily achieved (this could be considered a type of collision control to enable a single user to skip over or avoid the hold time of a call).

As a general description, an embodiment of the disclosure may include the following elements, components, processes, events, and entities:

A first entity that initiates or places a call to a second entity;

The first entity may be one of a human, a call center, or a form of automated process (such as a trained model that is capable of navigating through the prompts of an IVR system to a point at which an incoming call is placed into a hold or on-hold state);

An example of such a model or system is disclosed and described in U.S. patent application Ser. No. 18/079,527 titled "Systems and Methods for Automated Navigation of Interactive Voice Response Menu", filed Dec. 12, 2022, and the contents of which is incorporated by reference in its entirety;

A second entity that receives the call placed by the first entity;

The second entity may be a human, a call center, or an automated process;

A received call may be connected to an IVR system by the second entity;

As mentioned, in one example use case, the initiator of a call (i.e., the first entity) may use a properly trained model or process flow to navigate through the prompts of an IVR system until a hold state is reached;

One or both of the entities may generate speech segments that are received by the other entity;

For example, if the second entity is a call center, it may connect the incoming call to an IVR system which generates prompts "heard" or consumed by the first entity;

If the second entity is a call center, it may listen to/process the speech in the incoming call to assist in deciding whether to respond by answering the incoming call and routing the call to a service representative or department (e.g., if the first entity is another call center, the second entity may ignore or disconnect the call);

If the second entity is a human, they may listen to the speech in the incoming call or to a recording of the call without answering the incoming call in real-time;

One or both of the first and second entities may process speech segments received from the other entity upon connection;

In one example use case, this processing may be performed by a properly trained model or process flow operated by the first entity, typically using a different one than used to navigate through a set of IVR prompts;

In one example, a goal of using the model or process flow is to determine when an on-hold or hold period is ended and a human service representative is available to speak with the first entity;

Depending on if human speech is detected or if machine generated speech is detected during the hold period or other section of a call, an appropriate action is taken. As non-limiting examples:

First entity places call and processes speech segments:

If a human is the first entity and a call center is the second entity, generate a notification if/when human speech detected, as that indicates the availability of a human service representative;

In this scenario, the speech segment processing is performed by a process or service for the human who placed the call;

If call center or automated process is the first entity and a call center is the second entity, then generate a notification if/when human speech is detected, as that indicates the availability of a human service representative;

In this scenario, the speech segment processing is performed by a process or service for the call center that placed the call;

In one example use case, when the end of a hold period or state is detected, a separate trained model or process may be used to communicate with the human service representative at the second entity;

Second entity receives call and processes speech segments:

If a human is the second entity, then if speech in incoming call is from a human, generate a notification to the second entity (so they will presumably answer call);

If a human is the second entity and speech in incoming call is machine generated, then ignore/disconnect, or send to voicemail;

If recorded speech on voicemail is machine generated, then notify human who may choose to delete it and take no further action;

If call center is the second entity, and speech in incoming call is machine generated, then ignore/disconnect (i.e., do not route to human service representative).

FIG. 1(a) is a flow chart or flow diagram illustrating a method, process, operation, or set of functions that may be used to implement an embodiment of the disclosed and/or described system and methods. FIG. 1(b) is a flow chart or flow diagram illustrating a method, process, operation, or set of functions that may be used to implement speech segment processing as part of an embodiment of the disclosed and/or described system and methods. The set of steps or stages illustrated in FIGS. 1(a) and 1(b) represent an example of a process flow for determining whether a segment of speech was generated by a human or by a machine, such as a robotic voice that is synthesized and used as part of an IVR system.

As mentioned, in addition to other use cases, a use or context for implementing an embodiment of the disclosure includes the following:

Place call from first entity;

Call connected to second entity which executes a set of IVR prompts;

First entity uses a first model to navigate through the set of IVR prompts operated by the second entity to reach an on-hold or hold state;

A second model operated by the first entity monitors and processes speech segments received during the hold state (as speech and/or music is often played during a hold state) until a human at the second entity is available to speak;

When a human is available at the second entity, a third model operated by the first entity provides speech segments to the human;

In one embodiment, the third model implements a form of text-to-speech and may use a trained model to determine what speech segments to generate;

Once a human is available at the second entity, the third model receives the text corresponding to the human's speech and operates to classify the text input and generate a response in the form of text;

The textual response is then converted to audio/ speech and presented to the human at the second entity;

The response generated by the trained model may depend on one or more of a keyword, a department or function associated with the human at the second entity, or a level or subject matter of the prompts at the point in which the on-hold period began, as non-limiting examples.

As shown in FIG. 1(a), in a general example of a scenario or situation in which an embodiment would be implemented, a first entity places or otherwise initiates a call to a second entity (as suggested by step or stage 102). The first entity may be a human, a call center, or an automated process (such as a trained model that is capable of navigating through a set of IVR prompts). The second entity may be a human, a call center, or an automated process (such as an answering machine or service).

The received call is connected and generates speech segments that are received by the first entity. In one example (as suggested by step or stage 104), the received call at the second entity is connected to an IVR system that generates a set of speech segments in the form of prompts. The prompts may be navigated through (either by a human or automated process) and places the incoming call into a "on hold" state. In another example, the received call generates speech segments that are received by the first entity and placement of the call into a on hold state does not occur (as suggested by step or stage 105).

Depending on the entities involved and the context, purpose, or goal of the processing to determine if a speech segment is generated by a human or by a machine, one or both of the entities may execute a process flow to identify whether a speech segment in the call is human generated or machine generated (as suggested by step or stage 106, and as described in greater detail with reference to FIG. 1(b)). Based on a determination of whether a speech segment is human or machine generated, the entities involved, and the context, purpose, or goal of the processing, an indicated or desired action is performed (as suggested by step or stage 108).

In one embodiment (as illustrated in FIG. 1(b)), the disclosed and/or described method for processing speech segments may comprise one or more of the following steps, stages, processes, operations, or functions:

As an example of a use case, placing a call and being connected to an IVR system that generates a set of prompts;

Navigating through the set of prompts to reach an on-hold or hold state;

In one embodiment, this may be accomplished by use of a trained model (as suggested by step or stage 109);

Processing an audio segment containing speech to convert the speech into text using an automatic speech recognition (ASR) system (as suggested by step or stage 110);

Creating a processing "window" of a configurable size (as suggested by step or stage 112);

When a new word is generated by the ASR processing, it is added to the window. When this window reaches a configurable maximum size, the next word (token) is added and the oldest word (token) presently in the window is removed. This creates the equivalent of a moving window being slid over the text, where the window itself has a configurable size;

The configurable size of the window is related to the key words that it is modeling. For example, if a key word phrase is five words, then the configurable window needs to be at least five words long. Furthermore, if the maximum key word size is only two words, then the configurable window size should be at least two words long;

Generally, the configurable size should not be larger than the maximum key word size. If for example, the maximum key word size is a length of three and the window size was length ten, that would introduce a greater opportunity for errors or at least for greater uncertainty or ambiguity;

Because calculating window size is related to keyword size, embodiments can typically focus on keyword calculation. One can, as an example, take a dataset of conversations and hand annotate where the conversation transfers from a machine to a human speaker. From there, one could aggregate all text up to the change in speaker. Then, one could analyze the language patterns that occur in the beginning of the human speech but do not occur (or are unlikely to occur) in the machine generated speech;

Once phrases or a sequence of words more common or unique to human speech have been determined, one would set the configurable size to the maximum keyword size where the keywords are a form of an n-gram or other representation;

Another approach is to examine human speech and populate keywords and the respective window size with phrases. Following this, one would test results and repeat until a stable set of keywords and window sizes are found;

Consider the input as a set of key-value pairs. Each key is the token being added to the window and the value contains information regarding a word, phrase, or other section of text obtained by converting an audio segment;

For example, the value could contain a list that includes the word, the volume of the word when spoken, an indication of emphasizing a word, the elapsed time length of the word, and the time between that word and the previous word. In this way the disclosed and/or described system has relevant information at its disposal to assist in its evaluation of the speech segment;

In some embodiments, additional information (i.e., values or features) may be added to assist in specific use cases, such as to overcome transcription errors or variability;

For example, consider a model that takes as its input one or more features regarding a section of speech. Modeling the problem in that way means it is not limited to a time dimension (i.e., the system is able to perform real time and/or retroactive analysis). The input itself need not only be words or phrases. As non-limiting examples, an embodiment may consider as values or features one or more of the following:

Words;

Clusters of words—a word might be "disconnected" from another key word and could have meaning for a prediction of human vs. machine origin;

Time between words;

Speed of speech;

Variation in speed of speech;

Changes in volume;

Emphasis of specific words or phrases;

As mentioned, use of additional values may assist in overcoming variability or errors in transcription. This is because looking only at the transcribed words may be insufficient for model stability or accuracy (e.g., the cadence of words might be a relevant predictor of human or machine generated speech);

Optionally, calculate summary statistics for the window, the minimum phrase size in terms of length of the word, the maximum phrase size, the average phrase size, or the standard deviation or variance in breaks between words, as non-limiting examples. This would enable comparing the summary statistics across different windows;

As a non-limiting example of the use of additional features, an expansion of what are termed keywords may include:

Keywords are triggered, AND volume variability must be within a specified value;

Keywords are triggered, OR volume variability must be within a specified value;

One can make the detections/decisions more or less strict, or less strict and dependent on the use case;

A way to implement this capability is follows. For each feature (e.g., volume, speed, silence) determine a threshold and a rule. This would be something such as "if speed between two words is less than z, then determine it is likely machine generated". The determination of such a rule would be from what was done with only keywords;

Calculate the values in the machine section and the beginning of the human section;

Compare the values from each section and select the appropriate thresholds where separability between the sections is sufficiently clear;

Configure these rules as being required, (the AND case with the traditional keywords, or simply the (OR case));

The configuration or representation of these rules could be specified with a known data structure, such as simple key value pairs, where each key is a rule name, and each value is the representation of it:

As an example—Key=words, value=list of required words;

Key=volume, value=what the required volume for a set of words are;

Processing each word or sequence of words in the text in the window using a text normalization or standardization process to remove punctuation or perform a different operation to place text into a more uniform state (as suggested by step or stage 114). By doing this, the system ensures that the elements in the window are true elements and not punctuation or other aspect that should be ignored;

For example, in addition to punctuation, it may be desirable to remove stop words, or to remove hesitation words (e.g., "um" or "hmm"). Sometimes these hesitation words are added by a transcription model when it detects a click or pop in an audio stream;

The choice of which (if any) words or punctuation to remove may be important to consider and may depend on the domain as well as the separability between the sections of a call or interaction;

Accessing a set of one or more keywords (and/or other features, as disclosed and/or described herein) and determine if one or more of the keywords are in the text (in the window) being evaluated (as suggested by step or stage 116);

In one embodiment, the keywords each relate to or are indicative of a specific language pattern that has been defined or described. In one embodiment, the system determines if one or more of the specified keywords are in the window. If one or enough of the keywords are in the sliding window, the system terminates the processing and generates a notification that the "event", or language pattern has been detected;

In one embodiment, a set of criteria or rule, that if triggered would indicate that the speech was determined to be live human generated speech and not that of a pre-recorded human or machine may be applied:

As an example, a set of keywords or phrase being searched for in the text could be associated with a rule having an indication of a variance of time between words of value x, with an average speech speed of at least a value y;

In this example, if the keywords or phrase was found in the text and had the characteristics defined in the rule, then the system would determine that the "event" had been found;

As described, a keyword may be a word or sequence of words characteristic of a specific speaker, or generally found in human speech. The sequence or keyword may include pauses, distortions, or other sounds characteristic of human speakers, but not expected in speech generated by a machine;

This might include hesitation words ("um", "hmm"). Further, human speakers exhibit more variation in speech speed and volume than machine generated speech. Each of these aspects is detectable and may be used for purposes of "predicting" the source of a segment of speech;

As disclosed and/or described herein, other features or characteristics may be used in addition to (or instead of) keywords as determine if a segment of speech is human or machine generated;

The keywords each relate to or are indicative of a specific language pattern of a human or a specific human. In one embodiment, a system determines if one or more of the specified keywords are in the window. If one or enough of the keywords are in the sliding window, the system operates to terminate and generates a notification that the "event", or language pattern has been detected;

A set of relevant keywords may be generated from one or more sources—as a non-limiting example of a process flow to generate a set of keywords:

Take all speech generated by an IVR and all speech generated by humans in a set of audio segments;

Convert all such speech samples into text;

Calculate n-grams for each part of the dataset (i.e., human and IVR generated speech). An n-gram is a contiguous sequence of n items (words) from a given sample of text;

Using the n-grams, compare the words and phrases for each group. This will identify words and/or phrases that are unique to each group;

To assist with the analysis, the process may limit the words in the human dataset to the words and phrases occurring in the first few seconds of an interaction with the IVR system. The unique words/phrases spoken in the first few seconds of the human speech that are distinct from words and phrases in the automated/robotic speech section may then serve as keywords or patterns to search for;

If desired, in addition to (or instead of) keyword detection, other features (speech speed, pauses, cadence, pronunciation, emphasis, accent, etc.) may be used to identify a speech segment as most likely human or machine generated (as suggested by step or stage 118):

An embodiment can analyze features such as speed of speech. This may be useful as machine generated speech and human speech have distinctly different speeds. Therefore, it can increase accuracy and reliability of a system to include this in a decision process. In one embodiment, the speed of speech data may be combined with detection of one or more keywords;

An embodiment can obtain predictive information by considering periods of silence. A system may use the amount of detected silence to allow determination of machine generated (robotic) as opposed to human speech. This will allow the system to consider another item of predictive information when classifying whether a speech segment was most likely human, or instead machine generated. This feature can be combined with one or more of the features discussed herein;

Another source of information that can be used to decide between human generated and machine generated speech is the time separation between words, as well as silence or a pause between specific words;

Thus, an embodiment may operate to extract information in addition to the presence or absence of specific words and use that information to make a more accurate determination or classification as to the source of the speech being processed;

In some uses, an embodiment may configure multiple sets of keywords that make up a language pattern or event for detection as part of determining whether a speech segment is human, or machine generated;

For example, a human may at some points have longer or shorter pauses between words. The variability in time it takes a human to decide what to say when speaking would be higher than that of a preprogrammed machine that is instructed what to say and at a specific cadence;

Naturally, humans pause, reflect, gather themselves, give bursts of statements or words, and these forms of variation are detectable and usable to distinguish between a human speaker and a machine;

Another example of a distinguishing feature is the volume of speech and the volume changes from word to word—a human speaker would typically exhibit variability in the volume in which they speak while a machine may be more consistent;

In some uses, a system may configure multiple sets of keywords that make up a language pattern or event to be detected as indicating a human or machine generated speech segment, where the identification of more than a single set of keywords increases a confidence level in the determination of human or machine speech;

As a guide to determine if one of the alternative analysis techniques may be useful or needed, consider the disclosed system as having a set of inputs and a resulting accuracy. This accuracy can be thought of as both accuracy in the traditional sense and a level of consistency between subjects and settings. As the inputs are increased in number and/or characteristics, the system becomes more adaptable and accurate;

For example, consider a model that uses keywords with no other inputs—in this situation, if the human has an odd greeting pattern such as "greetings and salutations", then the system would most likely fail to correctly classify this as human speech because it does not match the set of pre-defined keywords. However, by providing the system with a greater number of inputs, it receives more information with which to make a correct prediction;

Further, suppose the use case is such that there is concern about a false positive rate/false negative rate. This means that not only is there a sensitivity to overall accuracy, but also a sensitivity to getting a prediction wrong when it should be correct;

As an example—it may be preferable to trigger an event and be wrong than to not trigger an event and be wrong. This decision or preference is related to what set of inputs can or should be used to trigger an event;

Another aspect is how tolerant a domain is to errors. For example, for one domain 90% accuracy with a simple model may be sufficient. However, in another domain, such as contacting police or emergency services, a 90% accuracy may be unacceptable. In this scenario, additional inputs would be needed to increase accuracy and stability, particularly with regards to edge cases;

Formally, one could calculate the system's accuracy against a training set and then determine if that accuracy is sufficient for a given a domain. From there, one could continuously add speech features (e.g., pauses, speed, or use of common phrases, as non-limiting examples) and retest the accuracy each time. This would be repeated until an acceptable threshold was met;

To determine which of the additional techniques to use, one could implement each feature and then evaluate which contributes the highest gain in accuracy, where it is expected that this would be related to the domain characteristics or use case;

An embodiment may store summary statistics for an entire window and compare that overtime (this is in effect comparing window to window). This could be used as part of edge case detection for a situation that is missed within a window;

Based on determining whether a segment of speech was generated by a human or by a machine process (e.g., a recording or voice synthesis), perform one or more events or actions, where those events, or actions may include one or more of (as suggested by step or stage 120):

Generate a notification or form of alert to a waiting caller (such as a customer or user) that a human call center agent is available to speak with them;

Initiate a call-back to a human who contacted the call center or other IVR system;

Initiate a process to execute a model that receives speech from a human at a call center, converts that speech to text, operates a trained model to classify the text, and in response to the classification, generates a response in the form of text which is converted to speech and presented to the human (as suggested by step or stage 122);

This process flow may be used to present a specific request for a service or information to the human and expedite resolution of a problem or accomplish a task;

As disclosed and/or described, use cases for an embodiment may include one or more of:

Screening of incoming calls to a user, followed by sending a notification to a mobile cellphone or landline user if an incoming call is from a machine/ robot or from a human;

Screening of voicemails to determine if the entity that called and left a message was a human or machine/ robot;

In this regard, a valuable use case may be a call center that is trying to detect if an incoming caller is a machine or human, and use that to deny service or routing to a service representative if the incoming call is from a machine source;

Determine or enhance an understanding of the distribution of the duration of a set of calls or of a set of sections or events of a call;

This may be of use in determining the expected hold times during a call;

Similarly, this information may be used to evaluate the efficiency and call processing flow of a call center based on response times, resolution times, or another metric;

This information may be used to generate trained models that can then be used to automate call processing, and provide better services to operators of an IVR system and to callers who interact with those systems;

For example, if hold times are understood and automated, then a user (either a caller or a call center customer support person) may be able to initiate another call while they are currently on the phone.

Another example use case is if call center 1 is calling call center 2, then call center 1 may want to optimize when during the day they call specific departments within call center 2. This may be because call center 2 has different hold times based on time of day and department within the call center (e.g., billing, returns, or new customer departments, as examples). Therefore, by call center 1 using an embodiment of the disclosed systems and methods and evaluating hold times for each department of call center 2 given the time of day and department, call center 1 can optimize when they have an agent call specific departments at call center 2.

As mentioned, in addition to, or instead of the above example use case(s), another application of the disclosed and/or described processing is detecting if an unknown number contacting an everyday person is a machine or a human. This could be implemented by screening a call by having a phone answer the call, listening to the speech by the outbound party, transcribing the speech, adding each word along with additional inputs, (such as speed of speech, as an example) to the configurable window, comparing the window to a set of keywords and criteria, determining if the caller is a human, and if the caller is a human, then notifying the call recipient that the person calling is human (or vice-versa if machine generated, in which case they may choose to ignore the incoming call).

Another use case is detecting if an inbound call to a call center is from a machine or from a human. This could be implemented by screening a call by having a phone answer the call, listening to the speech by the outbound party, transcribing the speech, adding each word along with additional inputs, (such as speed of speech, as an example) to the configurable window, comparing the window to a set of keywords and criteria, determining if the caller is a human, and if the caller is a human, then notifying the call recipient (a call center rep) that the person calling is human (or vice-versa if machine generated). If the inbound call was determined to be machine generated, then the recipient call center or system might decide not to route the call to a call center representative.

As a further example, a use case applicable to operation of a call center is to monitor an outbound call to a second call center that has hold times, add each word along with additional inputs, (such as speed of speech) to the configurable window (this is in effect transcribing the hold section that a call center places a caller on), compare the window to a set of keywords and criteria, determine if the speaker is a human, and if the speaker is a human, then notify the person waiting to speak with a call center representative that a human is ready to speak, and if the speaker is a machine, then keep waiting.

Embodiments of the disclosure are directed to determining whether speech is human or machine-generated in real-time, and almost immediately after a speaker begins to speak. This means that the cues conventionally used for this determination often will not work because those are based on access to a larger corpus of text. As a baseline, the disclosed and/or described approach enables distinguishing IVR originated speech and human generated speech based on the presence of specific keywords or phrases. Using this as a foundation, the disclosed and/or described processing can apply additional analytic techniques to confirm that a section of speech is human-generated or machine-generated.

As an example, in operation, the disclosed and/or described approach has been observed to be capable of determining whether a segment of speech is produced by a human or a machine fast enough for a caller to react to an alert that a human (such as a call center rep) is ready before the human notices that no one is listening. That is, the approach operates to detect that a speaker is a human before the human finishes the first phrase of their speech (such as an introductory or welcoming sentence).

As another example of a distinguishing aspect of speech, there are typically historical variances in speech. The language used by a human speaker will have some drift (meaning subtle changes in speed or emphasis of syllables) while an automated voice will typically have none. Word spacing, words spoken per second, and pauses would be expected to have consistent values for machine-generated speech, in contrast to human speech where these characteristics would be expected to vary. These and other features or characteristics of a speech sample may be used to distinguish robotic (machine generated) speech from human speech.

In one embodiment, the disclosed and/or described solution may utilize a variation of techniques used in linguistic analysis. This is because by nature, human beings use different types of words than machine generated speech, such as the speech of an IVR (interactive voice response) system. This is true even down to the greeting pattern of an IVR compared to the greeting pattern of a human being. This makes it possible to implement a system to monitor for specific language patterns used by human beings that are expected to differ from those used by an IVR system. This allows an embodiment of the disclosure to detect whether a human is speaking or an IVR and do so substantially in real-time.

In one embodiment, such an identification or distinction can be made in less than 2 seconds on average. This means that in most cases, when a voice begins speaking, within 2 seconds the system can detect if it is a human being or a generated "voice" from an IVR.

Internal testing performed by the inventors on proprietary datasets has indicated an accuracy above 95% in detecting that a human is speaking as opposed to speech from an IVR prompt or response (or in some cases, a recording of a human speaking). Testing showed similar capabilities in detecting when a transfer to a human from an automated system has begun. As one non-limiting example, below is a configuration for the detection of an example of human speech. Note that the system can be configured to detect one or more of multiple sets of keywords or phrases that make up a language pattern or event.

```
HumanAgentEvent =
    keywords1 = [ my, name],
    keywords2 = [this, is, calling]
    .......
    keywordsN = [this, is, i'll]
```

In this example, if the system detected one of the keyword patterns listed above, then the system would conclude that a HumanAgentEvent has been detected (i.e., that a human service agent was participating in a conversation with a caller).

In the example above, note that IVR generated speech typically does not use the phrase "my name". In general, IVRs used in the domain represented by this example typically do not use words such as "my" or "I'll" because these words typically refer to an individual. This distinguishing characteristic does not apply to all domains, but in the specific domain from which this example was taken these phrases have consistently been shown to not occur in IVR sections of speech.

It is also possible to restrict the detection operation of human generated or machine generated speech during the initial or introductory portion of an IVR session; for example, it may be desirable to configure the processing to implement detection of a human speaker after the initial 10 seconds of a call. This may help in skipping boiler plate sections of IVR prompts or statements in the beginning of a session, save money, and improve accuracy.

Using the disclosed and/or described approaches, a system can search for multiple events. By combining one or more of the disclosed and/or described methods, a more accurate calculation of the duration and timing of sections of calls made to a call center can be determined. This information can be used to generate notifications to a human agent or inbound caller when they are expected to be needed for a conversation, as well as to assist in statistically analyzing the timing and likelihood of specific events during a call.

As a non-limiting example, consider a model based on the disclosed and/or described approach that has multiple inputs. In this model, assume the detectable characteristics (features or values) are keywords, length of silence(s) between words, and speed of speech. The model could be set up with a single configurable window size or with multiple window sizes. For example, a condition to trigger the detection of an "event" of human speech could be:

$$\text{Keywords} = ([\text{my}, \text{name}, \text{is}], [x, y], [w])$$

In this example, x=the time between the end of "my" and beginning of "name", y=the time between the end of "name" and beginning of "is", and w=the time from the beginning of "my" to the end of "is" divided by the number of keywords. This example model is taking as input, keywords, silence time, and speed of speech. In one implementation, there could be 3 rules or conditions: detection of keywords, the sum of x and y being less/greater than some value z, and w being greater than or less than some value t. Further, one could trigger the event if any of the three conditions are met, all three or met, or some combination of them are met.

For example, define a type 1 error as predicting the event and the model is wrong. Define a type 2 error as not predicting an event and the model is wrong. If because of the domain or use case, it is preferable to have a type 1 error, then one would want to trigger that the event has occurred when any of the three inputs are triggered. If one prefers a type 2 error, then one may want all three triggers to occur to classify the event.

As mentioned, in addition to (or instead of) the detection of human versus machine generated speech based on the presence of one or more keywords in the text corresponding to a speech segment, other "predictors" of human generated speech may be used. These may include, but are not limited to, speech cadence, changes in speech speed or emphasis, the presence of pauses, or other characteristics believed to be found in or more common to human generated speech and unlikely to be found in machine generated speech.

Figure 2:
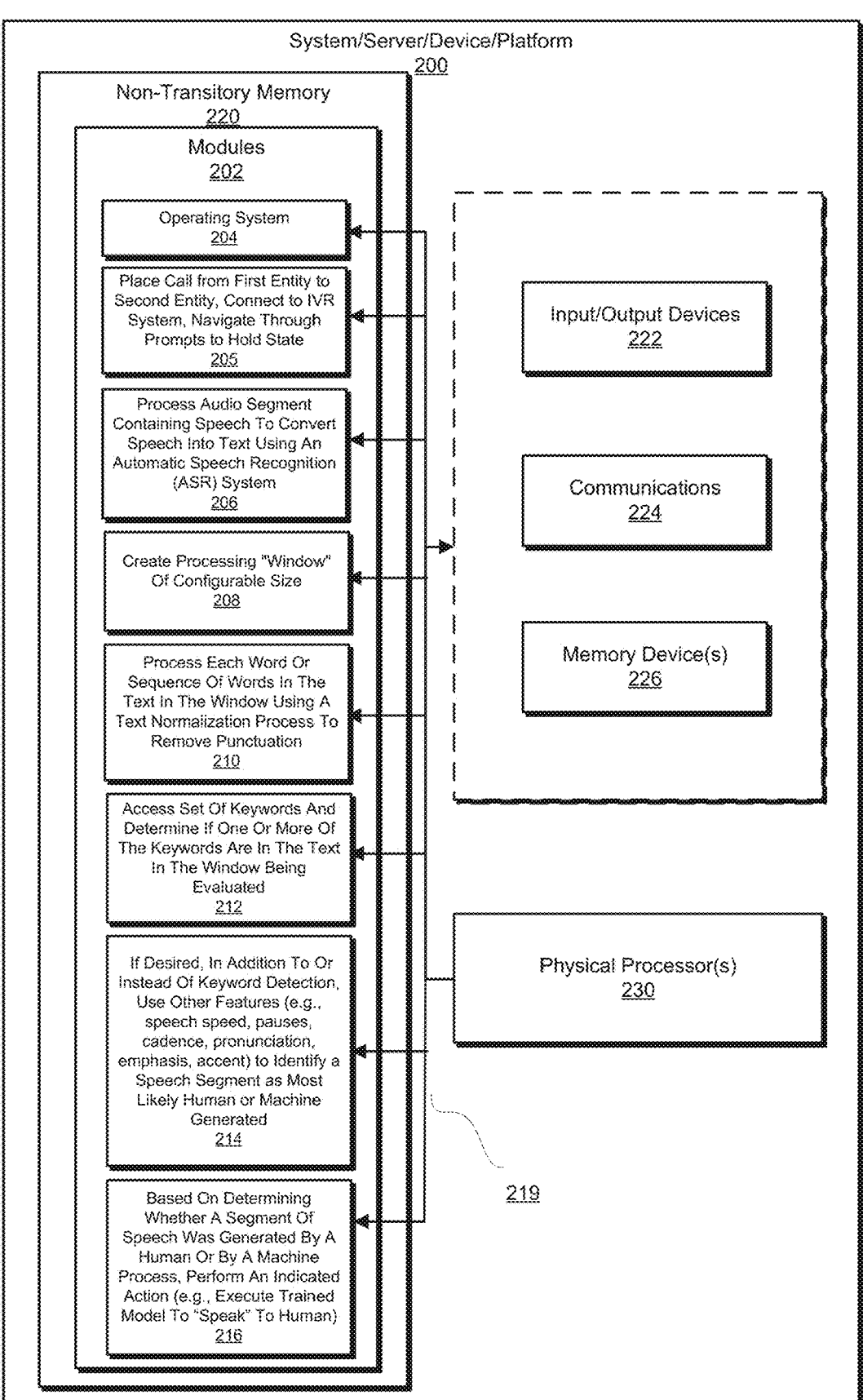
FIG. 2 is a diagram illustrating elements or components that may be present in a computing device or system configured to implement a method, process, function, or operation in accordance with an embodiment of the disclosed and/or described system and methods.

FIG. 2 is a diagram illustrating elements or components that may be present in a computing device, server, or system 200 configured to implement a method, process, function, or operation in accordance with an embodiment of the disclosed and/or described system and methods. As noted, in some embodiments, the disclosed and/or described system and methods may be implemented in the form of an apparatus that includes a processing element and set of executable instructions stored in (or on) a memory or other non-transitory data storage element. The executable instructions may be part of a software application and arranged into a software architecture.

In general, an embodiment of the disclosure may be implemented using a set of software instructions that are designed to be executed by a suitably programmed processing element (such as a GPU, TPU, CPU, microprocessor, processor, co-processor, or controller, as non-limiting examples). In a complex application or system such instructions are typically arranged into "modules" with each such module typically performing a specific task, process, function, or operation. The entire set of modules may be controlled or coordinated in their operation by an operating system (OS) or other form of organizational platform.

The application modules and/or sub-modules may include suitable computer-executable code or a set of instructions (e.g., as would be executed by a programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As shown in FIG. 2, system 200 may represent a server or other form of computing or data processing device or platform. Modules 202 each contain a set of executable instructions, where when the set of instructions is executed by a suitable electronic processor (such as that indicated in the figure by "Physical Processor(s) 230"), system (or platform, server, or device) 200 operates to perform a specific process, operation, function, or method.

Modules 202 may contain one or more sets of instructions for performing an operation, method, or function disclosed and/or described herein and/or described with reference to the Figures. These modules (or sub-modules) may include those illustrated but may also include a greater number or fewer number than those illustrated. Further, the modules and the set of computer-executable instructions that are contained in the modules may be executed (in whole or in part) by the same processor or by more than a single processor or processing component.

Modules 202 are stored in a (non-transitory) memory 220, which typically includes an Operating System module 204 that contains instructions used (among other functions) to access and control the execution of the instructions contained in other modules or sub-modules. The modules 202 in memory 220 are accessed for purposes of transferring data and executing instructions by use of a "bus" or communications line 219, which also serves to permit processor(s) 230 to communicate with the modules for purposes of accessing and executing a set of instructions. Bus or communications line 219 also permits processor(s) 230 to interact with other elements of system 200, such as input or output devices 222, communications elements 224 for exchanging data and information with devices external to system 200, and additional memory devices 226.

Each module or sub-module may correspond to a specific function, method, process, or operation that is implemented by the module or sub-module. Each module or sub-module may contain a set of computer-executable instructions that when executed by a programmed processor or co-processors cause the processor or co-processors (or a device or devices in which they are contained) to perform the specific function, method, process, or operation. Such function, method, process, or operation may include those used to implement one or more aspects of the disclosed and/or described system and methods, such as for:

Place Call from First Entity to Second Entity, Connect to IVR System, Navigate Through Prompts to Hold State (as suggested by step or stage 205);

Processing an audio segment containing speech to convert the speech into text using an automatic speech recognition (ASR) system (as suggested by module 206);

Creating a processing "window" of a configurable size (as suggested by module 208);

Processing each word or sequence of words in the text in the window using a text normalization or standardization process to remove punctuation or perform another operation (as suggested by module 210);

Accessing a set of keywords and determining if one or more of the keywords are in the text in the window being evaluated (as suggested by module 212);

If desired, in addition to or instead of keyword detection, use other features (e.g., speech speed, pauses, cadence, pronunciation, emphasis, or accent) to identify a speech segment as most likely human or machine generated as disclosed and/or described herein (as suggested by module 214);

Based on determining whether a segment of speech was generated by a human or by a machine process, perform an indicated action (as suggested by module 216);

For example, execute a trained model to classify a segment of human speech received from the second entity and in response, generate one or more segments of speech to present to the human using a speech generator process (e.g., a classifier that outputs a suggested response in the form of text that is then converted to speech and presented to the human).

As mentioned, each module or sub-module may contain instructions which when executed by a programmed processor or co-processor cause an apparatus (such as a server or client device) to perform the specific function or functions. The apparatus may be one or both of a client device or a remote server or platform. Therefore, a module may contain instructions that are performed (in whole or in part) by a client device, a server or platform, or both.

As mentioned, in some embodiments, the systems and methods disclosed and/or described herein may be provided (in whole or in part) through a SaaS or multi-tenant platform. The platform provides access to multiple entities, each with a separate account and associated data storage. Each account may correspond to a user, set of users, an entity, a set or category of entities, an industry, an IVR system, a call center wanting to monitor incoming calls and filter out machine generated calls, a communication session, or an organization, for example. Each account may access one or more services, a set of which are instantiated in their account, and which implement one or more of the methods or functions disclosed herein.

Figure 3:
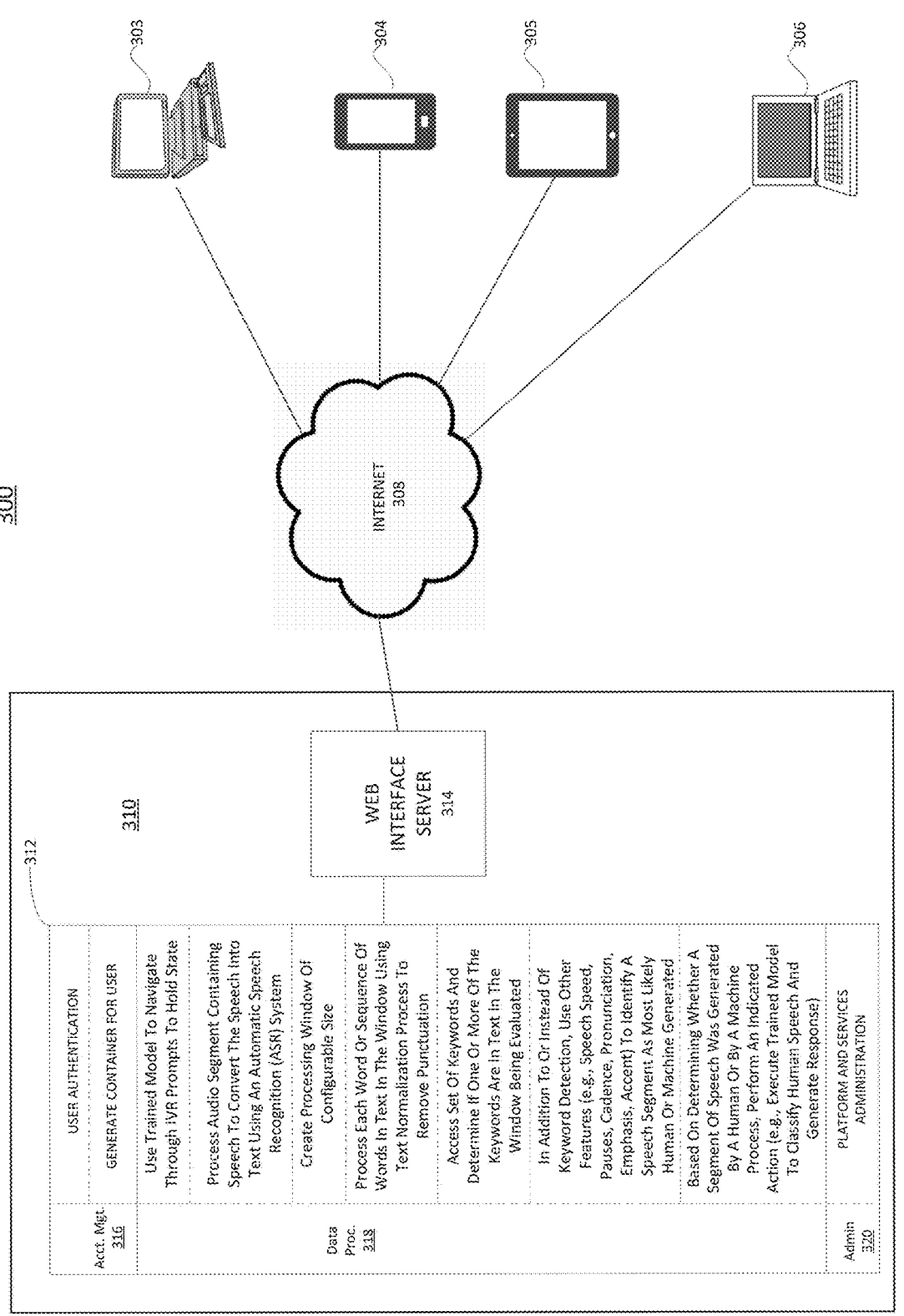
FIGS. 3-5 are diagrams illustrating a deployment of the system and methods disclosed herein for more effectively and accurately determining whether a segment of speech is spoken by a human or is machine generated (such as by an IVR system), as a service or application provided through a Software-as-a-Service platform, in accordance with an embodiment of the disclosed and/or described system and methods.
Figure 4:
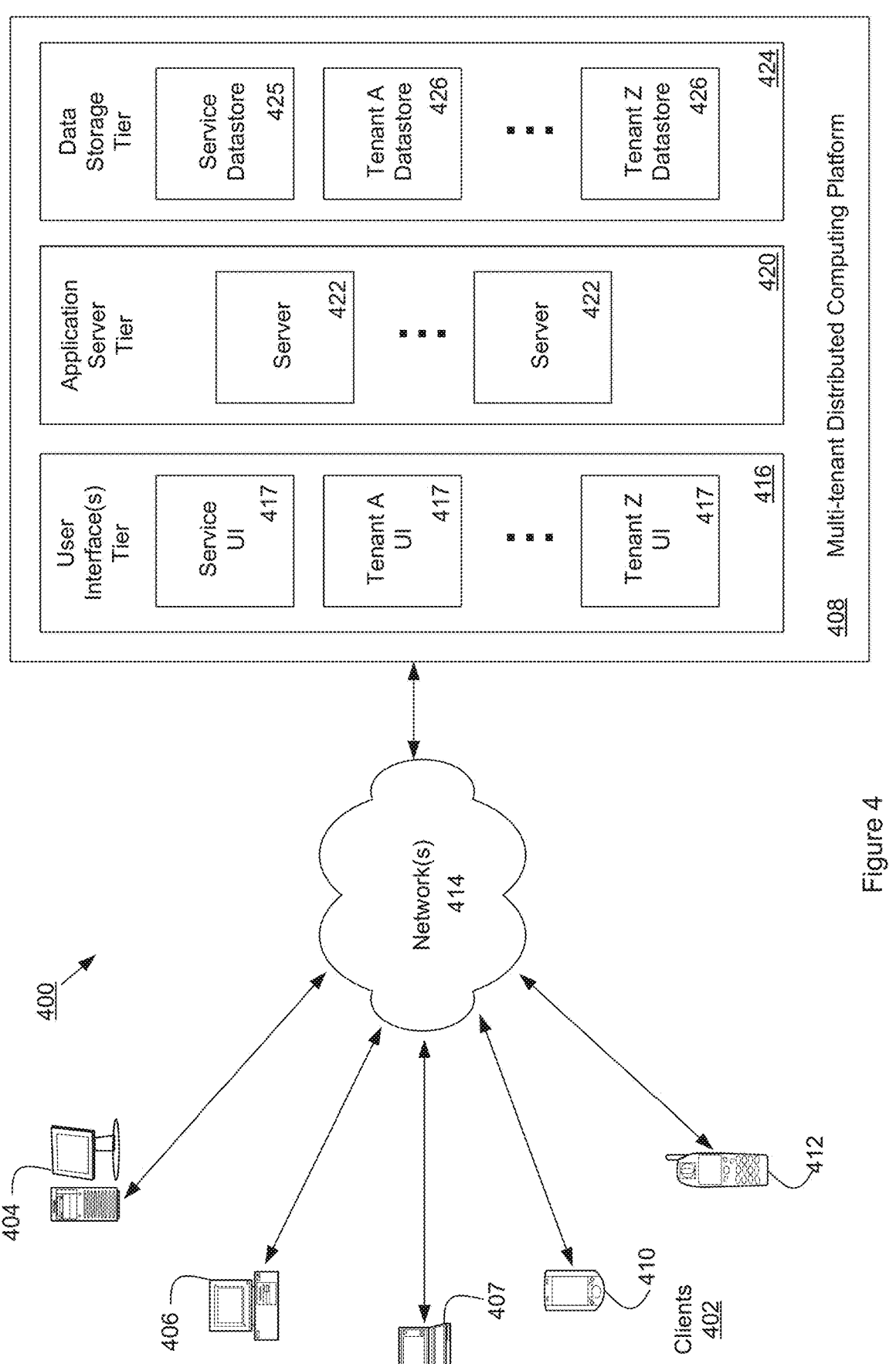
Figure 5:
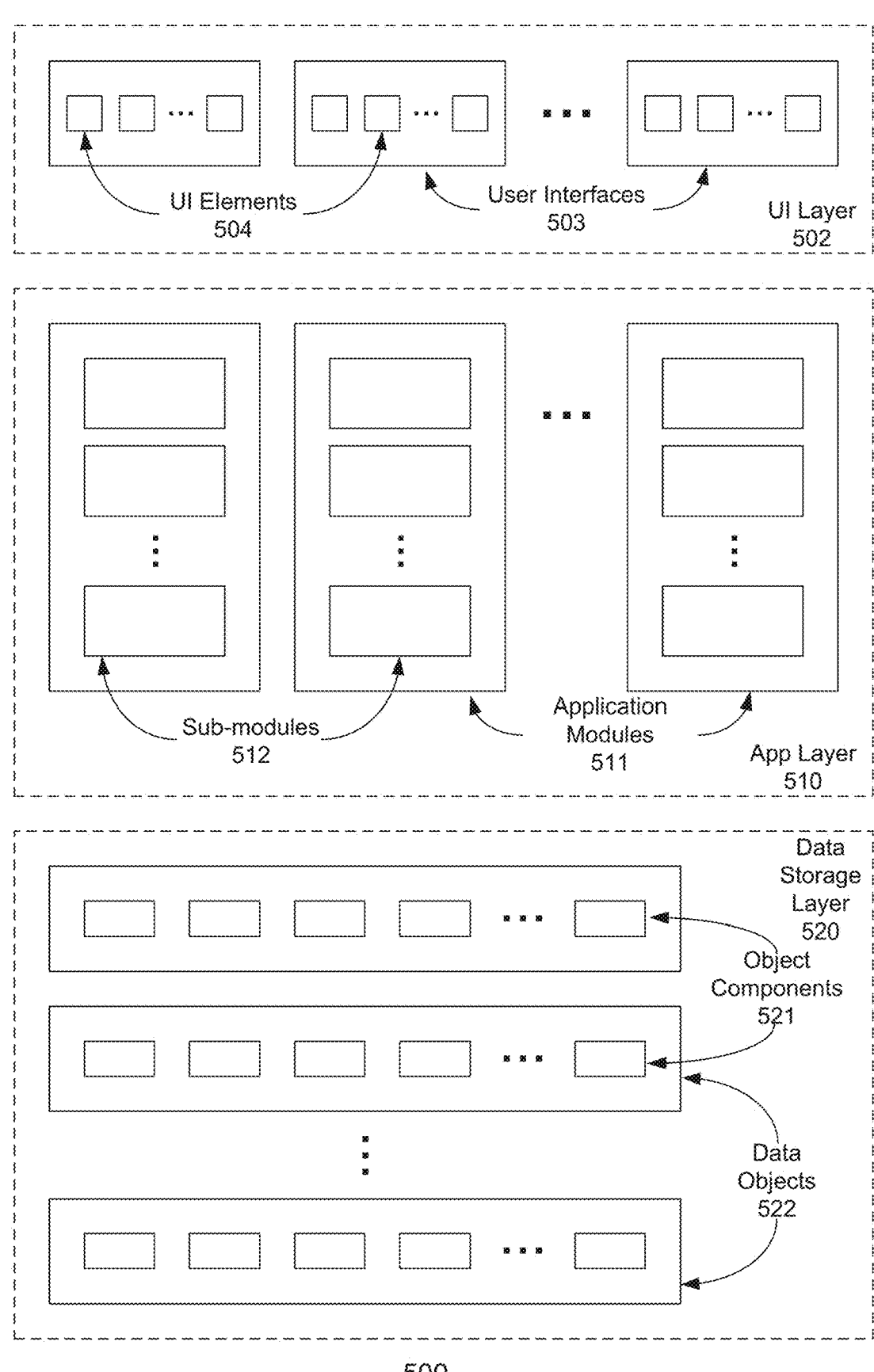

FIGS. 3-5 are diagrams illustrating a deployment of the system and methods disclosed herein for more effectively and accurately determining whether a segment of speech is spoken by a human or is machine generated (such as by an IVR system), as a service or application provided through a Software-as-a-Service platform, in accordance with an embodiment of the disclosed and/or described system and methods.

In some embodiments, the functionality and services provided by the system and methods disclosed and/or described herein may be made available to multiple users by accessing an account maintained by a server or service platform. Such a server or service platform may be termed a form of Software-as-a-Service (Saas). FIG. 3 is a diagram illustrating a SaaS system in which an embodiment of the disclosure may be implemented. FIG. 4 is a diagram illustrating elements or components of an example operating environment in which an embodiment of the disclosure may be implemented. FIG. 5 is a diagram illustrating additional details of the elements or components of the multi-tenant distributed computing service platform of FIG. 4, in which an embodiment of the disclosure may be implemented.

In some embodiments, the system or service(s) disclosed and/or described herein may be implemented as micro-services, processes, workflows, or functions performed in response to a user request. The micro-services, processes, workflows, or functions may be performed by a server, data processing element, platform, or system. In some embodiments, the services may be provided by a service platform located "in the cloud". In such embodiments, the platform is accessible through APIs and SDKs. The disclosed and/or described data processing and services may be provided as micro-services within the platform for each of multiple users or groups of users. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 3-5 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide the call data processing and evaluation methodology for a call center or human as disclosed and/or described herein.

Although in some embodiments, a platform or system of the type illustrated in FIGS. 3-5 may be operated by a 3$^{rd}$ party provider to provide a specific set of business-related applications, in other embodiments, the platform may be operated by a provider and a different business may provide the applications or services for users through the platform. For example, some of the functions and services described with reference to FIGS. 3-5 may be provided by a 3$^{rd}$ party with a provider of the disclosed speech processing services maintaining an account on the platform for a person, or for a company or business using those services as part of managing an IVR system and its interactions with end users.

FIG. 3 is a diagram illustrating a system 300 in which an embodiment of the disclosure may be implemented or through which an embodiment of the services disclosed and/or described herein may be accessed. In accordance with the advantages of an application service provider (ASP) hosted business service system (such as a multi-tenant data processing platform), users of the services may comprise individuals, businesses, or organizations. A user may access the services using a suitable client, including but not limited to desktop computers, laptop computers, tablet computers, scanners, or smartphones. In general, a client device having access to the Internet may be used to access and use the disclosed and/or described services. Users interface with the service platform across the Internet 308 or another suitable communications network or combination of networks. Examples of suitable client devices include desktop computers 303, smartphones 304, tablet computers 305, or laptop computers 306.

System 310, which may be hosted by a third party, may include a set of services 312 and a web interface server 314, coupled as shown in FIG. 3. Either or both services 312 and the web interface server 314 may be implemented on one or more different hardware systems and components, even though represented as singular units in FIG. 3. Services 312 may include one or more functions or operations for the development and implementation of a set of operations to enable the disclosed and/or described processing flows.

In some embodiments, the set of services or applications available to a company or user may include one or more that perform the functions and methods disclosed and/or described herein or described with reference to the enclosed figures. As examples, in some embodiments, the set of applications, functions, operations, or services made available through the platform or system 310 may include:

account management services 316, such as:

a process or service to authenticate a person wishing to access the services/applications available through the platform (such as credentials or proof of purchase, or verification that the customer has been authorized by a company to use the platform services);

a process or service to generate a container or instantiation of the services, methodology, applications, functions, and operations disclosed and/or described, where the instantiation may be customized for a particular user or company; and other forms of account management services;

a set 318 of data processing services, applications, operations, or functionality, such as a process or service for one or more of:

Place Call from First Entity to Second Entity, Connect to IVR System, Navigate Through Prompts to Hold State;

Processing an audio segment containing speech to convert the speech into text using an automatic speech recognition (ASR) system;

Creating a processing "window" of a configurable size;

Processing each word or sequence of words in the text in the window using a text normalization or standardization process to remove punctuation or perform another operation;

Accessing a set of keywords and determining if one or more of the keywords are in the text in the window being evaluated;

If desired, in addition to or instead of keyword detection, use other features (e.g., speech speed, pauses, cadence, pronunciation, emphasis, accent) to Identify a speech segment as most likely human or machine generated as disclosed and/or described herein;

Based on determining whether a segment of speech was generated by a human or by a machine process, perform an indicated action;

For example, execute a trained model to classify a segment of human speech received from the second entity and in response, generate one or more segments of speech using a speech generator process to present to the human; and administrative services 320, such as:

a process or services to enable the provider of the data processing services and/or the platform to administer and configure the processes and services provided to accounts/users.

The platform or system shown in FIG. 3 may be hosted on a distributed computing system made up of at least one, but typically multiple, "servers." A server is a physical computer dedicated to providing data storage and an execution environment for one or more software applications or services intended to serve the needs of users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, or web server.

FIG. 4 is a diagram illustrating elements or components of an example operating environment 400 in which an embodiment of the disclosure may be implemented. As shown in the figure, a variety of clients 402 incorporating and/or incorporated into a variety of computing devices may communicate with a multi-tenant service platform 408 through one or more networks 414. For example, a client may incorporate and/or be incorporated into a client application (e.g., software) implemented at least in part by one or more of the computing devices.

Examples of suitable computing devices include personal computers, server computers 404, desktop computers 406, laptop computers 407, notebook computers, tablet computers or personal digital assistants (PDAs) 410, smart phones 412, cell phones, and consumer electronic devices incorporating one or more computing device components (such as one or more electronic processors, microprocessors, central processing units (CPU), or controllers). Examples of suitable networks 414 include networks utilizing wired and/or wireless communication technologies and networks operating in accordance with a suitable networking and/or communication protocol (e.g., the Internet).

The distributed computing service/platform (which may also be referred to as a multi-tenant data processing platform) 408 may include multiple processing tiers, including a user interface tier 416, an application server tier 420, and a data storage tier 424. The user interface tier 416 may maintain multiple user interfaces 417, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant (or in some cases, a platform administrator) to administer the tenant's access to and use of the functions and capabilities provided by the service platform. This may include accessing tenant data, launching an instantiation of a specific application, or causing the execution of specific data processing operations.

Each application server or processing tier 422 shown in the figure may be implemented with a set of computers and/or components including computer servers and processors, and may perform functions, methods, processes, or operations as determined by the execution of a software application or set of computer-executable instructions. The data storage tier 424 may include one or more data stores, which may include a Service Data store 425 and one or more Tenant Data stores 426. Data stores may be implemented with any suitable data storage technology, including structured query language (SQL) based relational database management systems (RDBMS).

Service Platform 408 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information.

Such functions or applications are typically implemented by one or more modules of software code/instructions that are maintained on and executed by one or more servers 422 that are part of the platform's Application Server Tier 420. As noted with regards to FIG. 3, the platform system shown in FIG. 4 may be hosted on a distributed computing system made up of at least one, but typically multiple, "servers."

As mentioned, rather than build and maintain such a platform or system themselves, a business may utilize systems provided by a third party. A third party may implement a business system/platform in the context of a multi-tenant platform, where individual instantiations of a business' data processing workflow (such as the data processing and call management services disclosed and/or described herein) are provided to users, with each person, company, business, or IVR system representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple end users.

FIG. 5 is a diagram illustrating additional details of the elements or components of the multi-tenant distributed computing service platform of FIG. 4, in which an embodiment of the disclosure may be implemented. The software architecture shown in FIG. 5 represents an example of an architecture which may be used to implement such an embodiment. In general, an embodiment may be implemented using a set of software instructions that are executed by a suitably programmed processing element (such as a CPU, GPU, microprocessor, processor, controller, or other form of computing device). In a complex system such instructions are typically arranged into "modules" with each such module performing a specific task, process, function, or operation. The entire set of modules may be controlled or coordinated in their operation by an operating system (OS) or other form of organizational platform.

The example architecture 500 of FIG. 5 includes a user interface layer or tier 502 having one or more user interfaces 503. Examples of such user interfaces include graphical user interfaces and application programming interfaces (APIs). Each user interface may include one or more interface elements 504. For example, users may interact with interface elements to access functionality and/or data provided by application and/or data storage layers of the architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 510 may include one or more application modules 511, each having one or more submodules 512. Each application module 511 or sub-module 512 may correspond to a function, method, process, or operation that is implemented by the module or sub-module (e.g., a function or process related to providing data processing and services to a user of the platform). Such function, method, process, or operation may include those used to implement one or more aspects of the disclosed and/or described system and methods, such as for one or more of the processes, services, operations, or functions described with reference to the Figures:

Place Call from First Entity to Second Entity, Connect to IVR System, Navigate Through Prompts to Hold State;

Processing an audio segment containing speech to convert the speech into text using an automatic speech recognition (ASR) system;

Creating a processing "window" of a configurable size;

Processing each word or sequence of words in the text in a window using a text normalization or standardization process to remove punctuation or perform another operation;

Accessing a set of keywords and determining if one or more of the keywords are in the text in the window being evaluated;

If desired, in addition to or instead of keyword detection, use other features (e.g., speech speed, pauses, cadence, pronunciation, emphasis, accent) to identify a speech segment as most likely human or machine generated as disclosed and/or described herein; and Based on determining whether a segment of speech was generated by a human or by a machine process, perform an indicated action For example, execute a trained model to classify a segment of human speech received from the second entity and in response, generate one or more segments of speech using a speech generator process to present to the human.

The application modules and/or sub-modules may include a suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 422 of FIG. 4) may include each application module. Alternatively, different application servers may include different sets of application modules. Such sets may be disjoint or overlapping.

The data storage layer 520 may include one or more data objects 522 each having one or more data object components 521, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

The example computing environments depicted in FIGS. 3-5 are not intended to be limiting examples. Further environments in which an embodiment of the disclosure may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

This disclosure includes at least the following embodiments and clauses:

1. A method, comprising;

processing one or more speech segments generated by a first entity or by a second entity during a call placed by the first entity and received by the second entity by;

converting each segment of speech into text using an automatic speech recognition (ASR) system;

creating a processing window of a configurable size;

processing each word in the text in the configurable window using a text normalization or standardization process;

accessing a set of keywords determining if one or more of the keywords or are in the text in the configurable window, wherein the set of keywords represent a speech pattern or characteristics of a human speaker; and automatically performing an indicated action if a segment of speech is determined to be speech generated by a human or automatically performing a different indicated action if the segment of speech is determined to be speech generated by a machine.

2. The method of clause 1, wherein the second entity is a call center which connects the call to an IVR system associated with the call center, wherein the IVR system generates one or more prompts in the form of speech segments that are navigated through to be connected to a human call center representative, and wherein after navigation through one or more prompts, the call is placed into an on-hold state by the call center.

3. The method of clause 2, wherein the speech segments are navigated through using a trained model.

4. The method of clause 2, wherein the speech segments are processed by a service provided to the first entity, and if a segment of speech is determined to be speech generated by a human, then the indicated action is to alert the first entity that the human call center representative is available.

5. The method of clause 4, further comprising:

in response to the generated alert, executing a trained classifier to classify a speech segment generated by the human call center representative, and in response to the classification, generate a speech segment for presentation to the human call center representative.

6. The method of clause 4, wherein the speech segments are processed by a service provided to the second entity.

7. The method of clause 6, wherein if the segment of speech is determined to be speech generated by a machine, then the indicated action is to prevent the call being routed to a call center representative.

8. The method of clause 1, wherein the first entity is an automated process, the second entity is a human, the speech segments are processed by a service provided to the human, and the indicated action is to alert the human if the speech segments are machine generated.

9. The method of clause 1, wherein the text normalization or standardization process is one of removing punctuation, removing stop words, or removing hesitation words.

10. The method of clause 1, wherein multiple speech segments in multiple calls are processed and used to determine a distribution of the duration of a set of calls or of a set of sections of a call.

11. The method of clause 1, wherein the size of the configurable processing window is no larger than a maximum keyword size for a speech segment or speech segments.

12. The method of clause 11, wherein the maximum keyword size is determined by a process that includes forming a set of n-grams based on the text generated from a speech segment or speech segments.

13. A system, comprising:

one or more electronic processors configured to execute a set of computer-executable instructions; and one or more non-transitory computer-readable media containing the set of computer-executable instructions, wherein when executed, the instructions cause the one or more electronic processors or a device or apparatus in which they are contained to process one or more speech segments generated by a first entity or by a second entity during a call placed by the first entity and received by the second entity by;

converting each segment of speech into text using an automatic speech recognition (ASR) system;

creating a processing window of a configurable size;

processing each word in the text in the configurable window using a text normalization or standardization process;

accessing a set of keywords determining if one or more of the keywords or are in the text in the configurable window, wherein the set of keywords represent a speech pattern or characteristics of a human speaker; and automatically perform an indicated action if a segment of speech is determined to be speech generated by a human or automatically performing a different indicated action if the segment of speech is determined to be speech generated by a machine.

14. One or more non-transitory computer readable media containing a set of computer-executable instructions, wherein when the set of instructions are executed by one or more electronic processors or co-processors, the processors or co-processors or a device or apparatus in which they are contained operate to:

process an audio segment containing speech to convert the speech into text using an automatic speech recognition (ASR) system;

create a processing window of a configurable size;

process each word in the text within the window using a text normalization process to remove punctuation;

access a set of keywords and determine if one or more of the keywords are in the text being evaluated, the set of keywords representing a speech pattern characteristic of a human speaker; and based on determining if the audio segment was generated by a human or by a machine process, perform an indicated action.

Embodiments of the disclosure can be implemented in the form of control logic using computer software in a modular or integrated manner. Based on the disclosure and teachings provided herein, a person of ordinary skill in the art may know and appreciate other ways and/or methods to implement an embodiment using hardware and/or a combination of hardware and software.

Machine learning (ML) is being used more and more to enable the analysis of data and assist in making decisions in multiple industries. To benefit from using machine learning, a machine learning algorithm is applied to a set of training data and labels to generate a "model" which represents what the application of the algorithm has "learned" from the training data. Each element (or instances or example, in the form of one or more parameters, variables, characteristics or "features") of the set of training data is associated with a label or annotation that defines how the element should be classified by the trained model.

A machine learning model in the form of a neural network is a set of layers of connected neurons that operate to make a decision (such as a classification) regarding a sample of input data. When trained (i.e., the weights connecting neurons have converged and become stable or within an acceptable amount of variation), the model will operate on a new element of input data to generate the correct label or classification as an output.

A trained neural network, trained machine learning model, or other form of decision or classification process may be used to implement one or more of the methods, functions, processes, or operations disclosed and/or described herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" (nodes) that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons", where each layer has neurons that respond to different combinations of inputs from the previous layers.

Training of a network is performed using a "labeled" dataset of inputs in an assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

In addition to, or instead of a trained machine learning model, an expert system (such as a set of rules) may be applied to a set of features that are being used to distinguish human from machine generated speech. The features may be one or more of those mentioned, such as (but not limited to, or required to include) specific keywords, speech volume, speech silences, speech cadence, or variations in cadence, with the features used depending on the context, use case, desired accuracy, or other relevant factor.

The software components, processes or functions disclosed and/or described in the specification and figures may be implemented as software code to be executed by a processor using a suitable computer language such as Python, Java, Javascript, C, C++, or Perl using procedural, functional, object-oriented, or other techniques. The software code may be stored as a series of instructions, or commands in (or on) a non-transitory computer-readable medium, such as a random-access memory (RAM), a read only memory (ROM), a magnetic medium such as a hard-drive, or an optical medium such as a CD-ROM. In this context, a non-transitory computer-readable medium is almost any medium suitable for the storage of data or an instruction set aside from a transitory waveform. Such a computer readable medium may reside on or within a single computational apparatus and may be present on or within different computational apparatuses within a system, platform, or network.

According to one example implementation, the term processing element or processor, as used herein, may be a central processing unit (CPU), or conceptualized as a CPU (such as a virtual machine). In this example implementation, the CPU, or a device in which the CPU is incorporated may be coupled, connected, and/or in communication with one or more peripheral devices, such as a display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps and application programs stored on removable and non-removable memory media, to off-load data from a device, or to upload data to a device.

Example implementations of an embodiment of the disclosure are described herein with reference to block diagrams of systems, and/or to flowcharts or flow diagrams of functions, operations, processes, or methods. One or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not need to be performed in the order presented or may not need to be performed at all.

The computer-executable program instructions may be loaded onto a general-purpose computer, a special purpose computer, a processor, or other programmable data processing apparatus to produce a specific example of a machine, where the instructions that are executed by the computer, processor, or other programmable data processing apparatus create means for implementing one or more of the functions, operations, processes, or methods disclosed and/or described herein. The computer program instructions may be stored in a computer-readable memory that directs a computer or other programmable data processing apparatus to function in a specific manner, such that the instructions stored in the computer-readable memory produce an article of manufacture including instruction means that implement one or more of the functions, operations, processes, or methods disclosed and/or described herein.

While example implementations of one or more embodiments of the disclosure have been described in connection with what is presently considered to be a feasible approach, embodiments are not limited to the disclosed implementations. The disclosed implementations are intended to cover various modifications and equivalent arrangements included within the scope of the appended claims. Although specific terms are employed herein, they are used in a generic and descriptive sense only and not for purposes of limitation.

This specification includes one or more examples to describe implementations of an embodiment of the disclosure, and to enable a person skilled in the art to practice the disclosed technology, including making and using a device or system and performing one or more incorporated methods. The patentable scope of an embodiment of the disclosure is defined by the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar references in the specification and in the claims are to be construed to cover both the singular and the plural, unless otherwise indicated herein or clearly contradicted by context. The terms "having," "including," "containing" and similar references in the specification and in the claims are to be construed as open-ended terms (e.g., meaning "including, but not limited to,") unless otherwise noted.

Recitation of ranges of values herein are intended to serve as a shorthand method of referring individually to each separate value inclusively falling within the range, unless otherwise indicated, and each separate value is incorporated into the specification as if it were individually recited.

Methods disclosed and/or described herein may be performed in a suitable order unless otherwise indicated herein or clearly contradicted by context. The use of examples, or exemplary language (e.g., "such as") is intended to better illuminate embodiments of the disclosure, and do not pose a limitation to the scope of the claims unless otherwise noted. No language in the specification should be construed as indicating a non-claimed element as essential to each embodiment of the disclosure.

As used herein (i.e., the claims, figures, and specification), the term "or" is used inclusively to refer to items in the alternative and in combination.

Different arrangements of the components depicted in the drawings and/or described herein, as well as components and steps not shown or described are possible. Similarly, some features and sub-combinations are useful and may be employed without reference to other features and sub-combinations. Embodiments of the disclosure have been described for illustrative and not for restrictive purposes, and alternative embodiments may become apparent to readers of this specification. Accordingly, the disclosure is not limited to the embodiments described herein and/or depicted in the drawings, and embodiments and modifications may be made without departing from the scope of the claims below.

What is claimed is:

1. A method, comprising;

processing one or more speech segments generated by a first entity or by a second entity during a call placed by the first entity and received by the second entity by;

converting each segment of speech into text using an automatic speech recognition (ASR) system;

creating a processing window of a configurable size;

processing each word in the text in the configurable window using a text normalization or standardization process;

accessing a set of keywords determining if one or more of the keywords or are in the text in the configurable window, wherein the set of keywords represent a speech pattern or characteristics of a human speaker; and automatically performing an indicated action if a segment of speech is determined to be speech generated by a human or automatically performing a different indicated action if the segment of speech is determined to be speech generated by a machine.

2. The method of claim 1, wherein the second entity is a call center which connects the call to an IVR system associated with the call center, wherein the IVR system generates one or more prompts in the form of speech segments that are navigated through to be connected to a human call center representative, and wherein after navigation through one or more prompts, the call is placed into an on-hold state by the call center.

3. The method of claim 2, wherein the speech segments are navigated through using a trained model.

4. The method of 2, wherein the speech segments are processed by a service provided to the first entity, and if a segment of speech is determined to be speech generated by a human, then the indicated action is to alert the first entity that the human call center representative is available.

5. The method of claim 4, further comprising:

in response to the generated alert, executing a trained classifier to classify a speech segment generated by the human call center representative, and in response to the classification, generate a speech segment for presentation to the human call center representative.

6. The method of claim 4, wherein the speech segments are processed by a service provided to the second entity.

7. The method of claim 6, wherein if the segment of speech is determined to be speech generated by a machine, then the indicated action is to prevent the call being routed to a call center representative.

8. The method of claim 1, wherein the first entity is an automated process, the second entity is a human, the speech segments are processed by a service provided to the human, and the indicated action is to alert the human if the speech segments are machine generated.

9. The method of claim 1, wherein the text normalization or standardization process is one of removing punctuation, removing stop words, or removing hesitation words.

10. The method of claim 1, wherein multiple speech segments in multiple calls are processed and used to determine a distribution of the duration of a set of calls or of a set of sections of a call.

11. The method of claim 1, wherein the size of the configurable processing window is no larger than a maximum keyword size for a speech segment or speech segments.

12. The method of claim 11, wherein the maximum keyword size is determined by a process that includes forming a set of n-grams based on the text generated from a speech segment or speech segments.

13. A system, comprising:

one or more electronic processors configured to execute a set of computer-executable instructions; and one or more non-transitory computer-readable media containing the set of computer-executable instructions, wherein when executed, the instructions cause the one or more electronic processors or a device or apparatus in which they are contained to process one or more speech segments generated by a first entity or by a second entity during a call placed by the first entity and received by the second entity by;

converting each segment of speech into text using an automatic speech recognition (ASR) system;

creating a processing window of a configurable size;

processing each word in the text in the configurable window using a text normalization or standardization process;

accessing a set of keywords determining if one or more of the keywords or are in the text in the configurable window, wherein the set of keywords represent a speech pattern or characteristics of a human speaker; and automatically perform an indicated action if a segment of speech is determined to be speech generated by a human or automatically performing a different indicated action if the segment of speech is determined to be speech generated by a machine.

14. The system of claim 13, wherein the second entity is a call center which connects the call to an IVR system associated with the call center, wherein the IVR system generates one or more prompts in the form of speech segments that are navigated through to be connected to a human call center representative, and wherein after navigation through one or more prompts, the call is placed into an on-hold state by the call center.

15. The system of claim 14, wherein the speech segments are navigated through using a trained model.

16. The system of claim 14, wherein the speech segments are processed by a service provided to the first entity, and if a segment of speech is determined to be speech generated by a human, then the indicated action is to generate an alert when the human call center representative is available.

17. The system of claim 16, wherein in response to the generated alert, executing a trained classifier to classify a speech segment generated by the human call center representative, and in response to the classification, generate a speech segment for presentation to the human call center representative.

18. The system of claim 14, wherein the first entity is an automated process, the second entity is a human, the speech segments are processed by a service provided to the human, and the indicated action is to alert the human if the speech segments are machine generated.

19. The system of claim 14, wherein the text normalization or standardization process is one of removing punctuation, removing stop words, or removing hesitation words.

20. The system of claim 14, wherein multiple speech segments in multiple calls are processed and used to determine a distribution of the duration of a set of calls or of a set of sections of a call.

* * * * *